(12) United States Patent
Broach et al.

(10) Patent No.: US 9,847,144 B1
(45) Date of Patent: Dec. 19, 2017

(54) LOW PRESSURE DROP NUCLEAR FUEL ASSEMBLY BOTTOM NOZZLE

(71) Applicant: Westinghouse Electric Company LLC, Cranberry Township, PA (US)

(72) Inventors: Kirkland D. Broach, Lexington, SC (US); Michael L. Lewis, Lexington, SC (US); Mark W. Peterson, Chapin, SC (US); David S. Huegel, Blythewood, SC (US); Peyton M. Frick, Chapin, SC (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 1208 days.

(21) Appl. No.: 14/243,954

(22) Filed: Apr. 3, 2014

(51) Int. Cl.
*G21C 3/33* (2006.01)

(52) U.S. Cl.
CPC ............ *G21C 3/3305* (2013.01); *Y02E 30/40* (2013.01)

(58) Field of Classification Search
CPC .............................. G21C 3/3305; Y02E 30/40
USPC .......................... 376/352, 434, 437, 443, 453
See application file for complete search history.

(56) References Cited

U.S. PATENT DOCUMENTS

| | | | | |
|---|---|---|---|---|
| 4,684,495 A * | 8/1987 | Wilson | G21C 3/3305 | 376/352 |
| 5,009,839 A * | 4/1991 | King | G21C 3/3206 | 376/443 |
| 5,225,152 A * | 7/1993 | Verdier | G21C 3/3206 | 376/352 |
| 5,255,297 A * | 10/1993 | Bryan | G21C 3/322 | 376/443 |
| 5,283,812 A * | 2/1994 | Verdier | G21C 3/3206 | 376/352 |
| 5,867,551 A * | 2/1999 | Toshihiko | G21C 3/3206 | 376/443 |
| 6,421,407 B1 | 7/2002 | Kang et al. | | |
| 6,608,880 B2 * | 8/2003 | Smith | G21C 3/3206 | 376/443 |
| 7,085,340 B2 | 8/2006 | Goldenfield et al. | | |
| 7,822,165 B2 * | 10/2010 | Broach | G21C 3/3206 | 376/352 |
| 8,369,475 B2 | 2/2013 | Lu et al. | | |
| 2006/0045231 A1 | 3/2006 | Lee et al. | | |

FOREIGN PATENT DOCUMENTS

| | | |
|---|---|---|
| EP | 0563694 A2 | 10/1993 |
| JP | 2011503534 | 1/2011 |
| KR | 20040040432 | 5/2004 |

OTHER PUBLICATIONS

Westinghouse Electric Company LLC, PCT/US2015/015521, PCT International Search Report, Nov. 27, 2015, 10 pages.

* cited by examiner

*Primary Examiner* — Jack W Keith
*Assistant Examiner* — Daniel Wasil
(74) *Attorney, Agent, or Firm* — Joseph C. Spadacene; Westinghouse Electric Company LLC

(57) ABSTRACT

A nuclear fuel assembly having a bottom nozzle with protrusions that extend from the upstream (lower or fluid entry) and downstream (upper or fluid exit) side of a horizontally supported perforated flow plate. The protrusions have a funnel-like shape that gradually decreases the lateral flow area on the upstream side of the perforated flow plate and gradually increases the lateral flow area on the downstream side of the perforated plate. The protrusions on the downstream side are preferably recessed to accommodate the ends of the fuel rods.

22 Claims, 13 Drawing Sheets

LOW PRESSURE DROP NUCLEAR FUEL ASSEMBLY BOTTOM NOZZLE

BACKGROUND

1. Field

The present invention relates generally to nuclear reactors and, more particularly, is concerned with reducing the pressure drop across the bottom nozzle of a nuclear fuel assembly.

2. Related Art

The primary side of nuclear reactor power generating systems which are cooled with water under pressure comprises a closed circuit which is isolated and in heat exchange relationship with a secondary circuit for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump, and a system of pipes which are connected to the vessel form a loop of the primary side.

For the purpose of illustration, FIG. 1 shows a simplified nuclear primary system, including a generally cylindrical reactor pressure vessel 10 having a closure head 12 enclosing a nuclear core 14. A liquid reactor coolant, such as water, is pumped into the vessel 10 by pump 16 through the core 14 where heat energy is absorbed and is discharged to a heat exchanger 18 typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor vessel 10 by reactor coolant piping 20.

An exemplary conventional reactor design is shown in more detail in FIG. 2. In addition to the core 14 comprised of a plurality of parallel, vertical, co-extending fuel assemblies 22, for the purposes of this description, the other vessel internal structures can be divided into the lower internals 24 and the upper internals 26. In conventional designs, the lower internals' function is to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel 10 through one or more inlet nozzles 30, flows down through an annulus between the reactor vessel and the core barrel 32, is turned 180° in a lower plenum 34, passes upwardly through lower support plate 37 and lower core plate 36 upon which the fuel assemblies are seated and through and about the fuel assemblies. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces cause an upward force on the fuel assembly whose movement is restrained by the upper internals including a circular upper core plate 40. Coolant exiting the core 14 flows along the underside of the upper core plate 40 and upwardly through a plurality of perforations 42. The coolant then flows upwardly and radially to one or more outlet nozzles 44.

The upper internals 26 are supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly moveable control rods 28, which typically include a drive shaft 50 and a spider assembly 52 of neutron poison rods (shown and described more fully with regard to FIG. 3), are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally effect control rod insertion capability.

FIG. 3 is an elevational view, represented in vertically shortened form, of a fuel assembly being generally designated by reference character 22. The fuel assembly 22 is the type used in a pressurized water reactor and has a structural skeleton which, at its lower end includes a bottom nozzle 58. The bottom nozzle 58 supports the fuel assembly 22 on lower core plate 36 in the core region of the nuclear reactor. In addition to the bottom nozzle 58, the structural skeleton of the fuel assembly 22 also includes a top nozzle 62 at its upper end and a number of guide tubes or thimbles 84 which align with guide tubes 54 in the upper internals. The guide tubes or thimbles 84 extend longitudinally between the bottom and top nozzles 58 and 62 and at opposite ends are rigidly attached thereto.

The fuel assembly 22 further includes a plurality of transverse grids 64 axially spaced along and mounted to the guide thimbles 84 and an organized array of elongated fuel rods 66 transversely spaced and supported by the grids 64. Also, the assembly 22, as shown in FIG. 3, has an instrumentation tube 68 located in the center thereof that extends between and is captured by the bottom and top nozzles 58 and 62. With such an arrangement of parts, the fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent fission byproducts from entering the coolant and contaminating the reactor system.

To control the fission process, a number of control rods 78 are reciprocally moveable in the guide thimbles 84 located at predetermined positions in the fuel assembly 22. Specifically, a rod cluster control mechanism 80, positioned above the top nozzles 62 of selected fuel assemblies, supports a plurality of the control rods 78. The control mechanism has an internally threaded cylindrical hub member 82 with a plurality of radially extending flukes or arms 52 that form the spider previously noted with regard to FIG. 2. Each arm 52 is interconnected to a control rod 78 such that the control rod mechanism 80 is operable to move the control rods vertically in the guide thimbles 84 to thereby control the fission process in the corresponding fuel assembly 22, under the motive power of a control rod drive shaft 50 which is coupled to the control rod hub 80, all in a well-known manner.

It is desirable to have a balanced flow across the reactor core, i.e., substantially the same pressure drop across each of the fuel assemblies, so that some of the fuel assemblies do not operate at higher temperatures than other fuel assemblies. Power output is limited by the hottest operating fuel element. Reducing pressure drop without comprising other beneficial features provides the fuel assembly designer the opportunity to add other features to make up for the reduced pressure drop, that can, for example, promote mixing which will enhance heat transfer that can translate into increased power output of the core. The bottom nozzles of the fuel assemblies, which include a horizontal top plate with a large number of flow through holes, is a significant contributor to that pressure drop. That is especially true for debris filter bottom nozzles which require that the holes be small enough to prevent the passage of debris that could damage the fuel rod cladding such as is described in U.S. Pat. No. 7,822,165, assigned to the Assignee of this application. Any modification that reduces the pressure drop across the fuel assemblies without otherwise adversely impacting the operation of the reactor core is desirable.

Therefore, it is an object of this invention to reduce the pressure drop across the fuel assemblies by modifying the design of the bottom nozzles to alter the shape of the flow through holes.

It is a further object of this invention to achieve that reduction in pressure drop by gradually changing the lateral flow area on either or both the upstream and downstream sides of the perforated flow plate of the bottom nozzle.

SUMMARY

These and other objects are achieved by a nuclear fuel assembly having a plurality of elongated nuclear fuel rods with an extended axial length. At least a lower most grid supports the fuel rods in an organized array having unoccupied spaces defined therein adapted to allow flow of fluid coolant therethrough and past the fuel rods when the fuel assembly is installed in a nuclear reactor. A plurality of guide thimbles extend along the fuel rods through and supporting the grid. A bottom nozzle is disposed below the lower most grid, below lower ends of the fuel rods and supports the guide thimbles. The bottom nozzle has openings therethrough to allow the flow of fluid coolant into the fuel assembly. The bottom nozzle includes a substantially horizontal plate supported orthogonal to the axis of the fuel rods. The horizontal plate has an upper face directed substantially toward the lower most grid and a lower face on an underside of the horizontal plate with the openings extending therethrough for the flow of coolant. At least some of the openings in the lower face have a funnel-like first appendage respectively extending below the lower face, around at least some of the openings in the lower face with an opening at the first appendage's substantially lowest extent having a larger diameter than a diameter of the opening in the lower face. An internal wall of the first appendage substantially gradually decreases in diameter from the opening at the first appendages substantially lowest extent until the wall of the first appendage transitions to the opening in the lower face. In one preferred embodiment, a lip in the opening in at least some of the first appendage's substantially lowest extent has a scalloped contour and preferably, the scalloped lip has a plurality of spaced depressions, resembling the contour of an egg receptacle in an egg carton and more preferably all of the lip of the opening at the first appendage's substantially lowest extent has such a scalloped contour.

In one embodiment, the nuclear fuel assembly includes a funnel-like second appendage that extends up from at least some of the openings in the upper face with an opening at the second appendage's substantially highest extent having a larger diameter than a diameter of the opening in the upper face. An internal wall of the second appendage substantially, gradually increases in diameter from the transition at the opening in the upper face to the second appendage's substantially highest extent. In this latter embodiment, a lip of the opening at the second appendage's substantially highest extent has a scalloped contour. Desirably, the second appendage is at least partially recessed within the opening in the upper face. In one embodiment the highest extent of the second appendage terminates below the lower ends of the fuel rods and desirably, the highest extent of the second appendage is smaller than the lowest extent of the first appendage. At least some of the openings in the bottom nozzle substantially align with the unoccupied spaces in the lower most grid.

In general, the internal wall of the first appendage gradually decreases the lateral flow area axially through the first appendage as the first appendage transitions to the opening in the lower face. The internal wall of the second appendage gradually increases the lateral flow area axially through the second appendage as the second appendage transitions from the opening in the upper face to the unoccupied flow spaces defined within the organized array of fuel rods.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
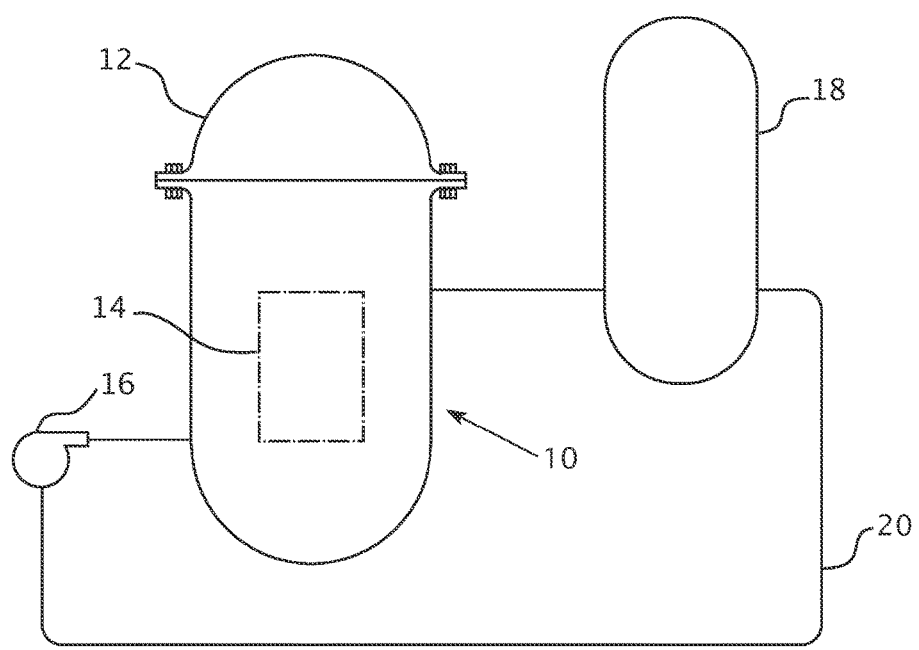
FIG. 1 is a simplified schematic of a nuclear reactor system to which this invention can be applied.
Figure 2:
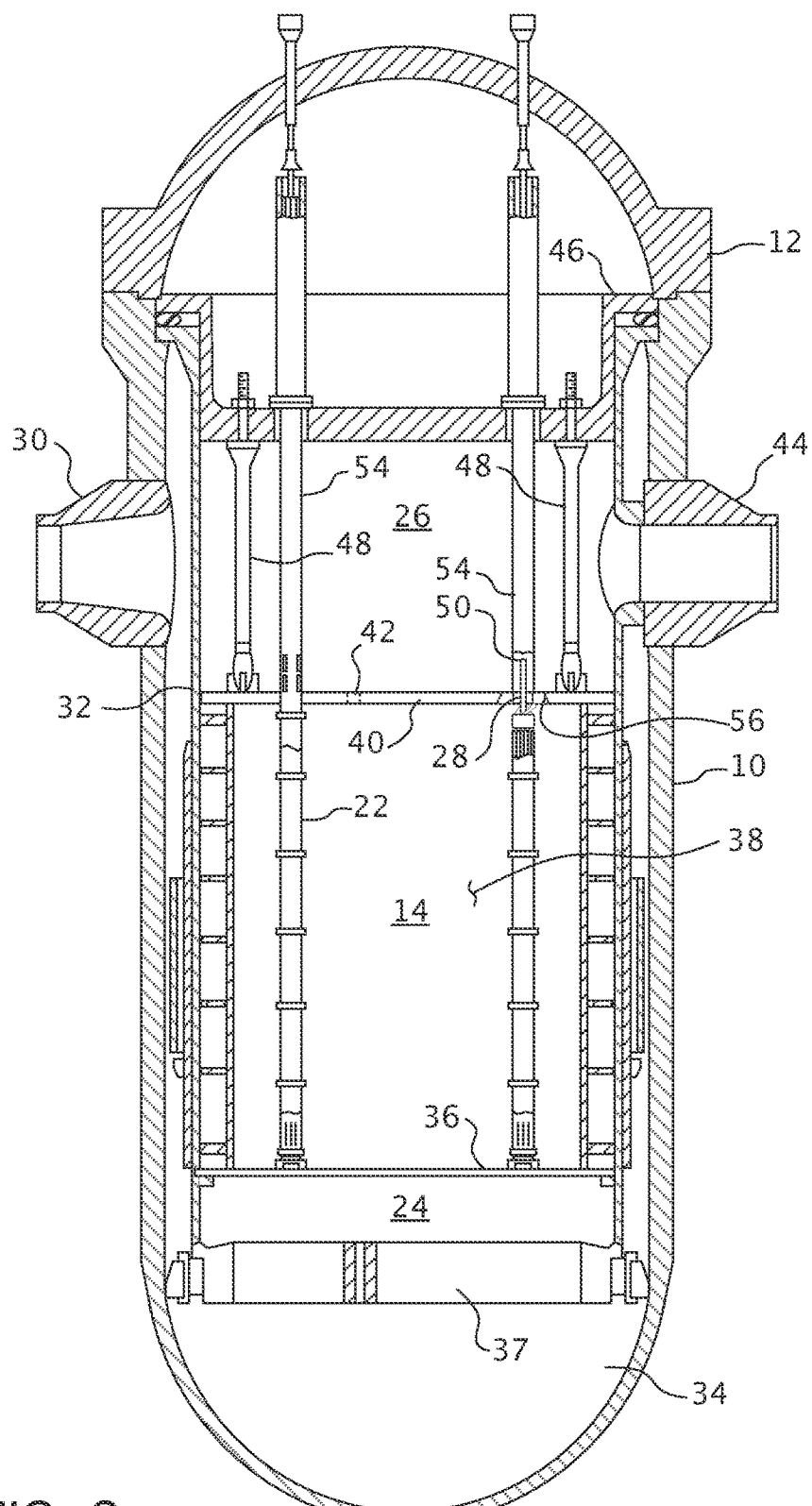
FIG. 2 is an elevational view, partially in section, of a nuclear reactor vessel and internal components to which this invention can be applied.
Figure 3:
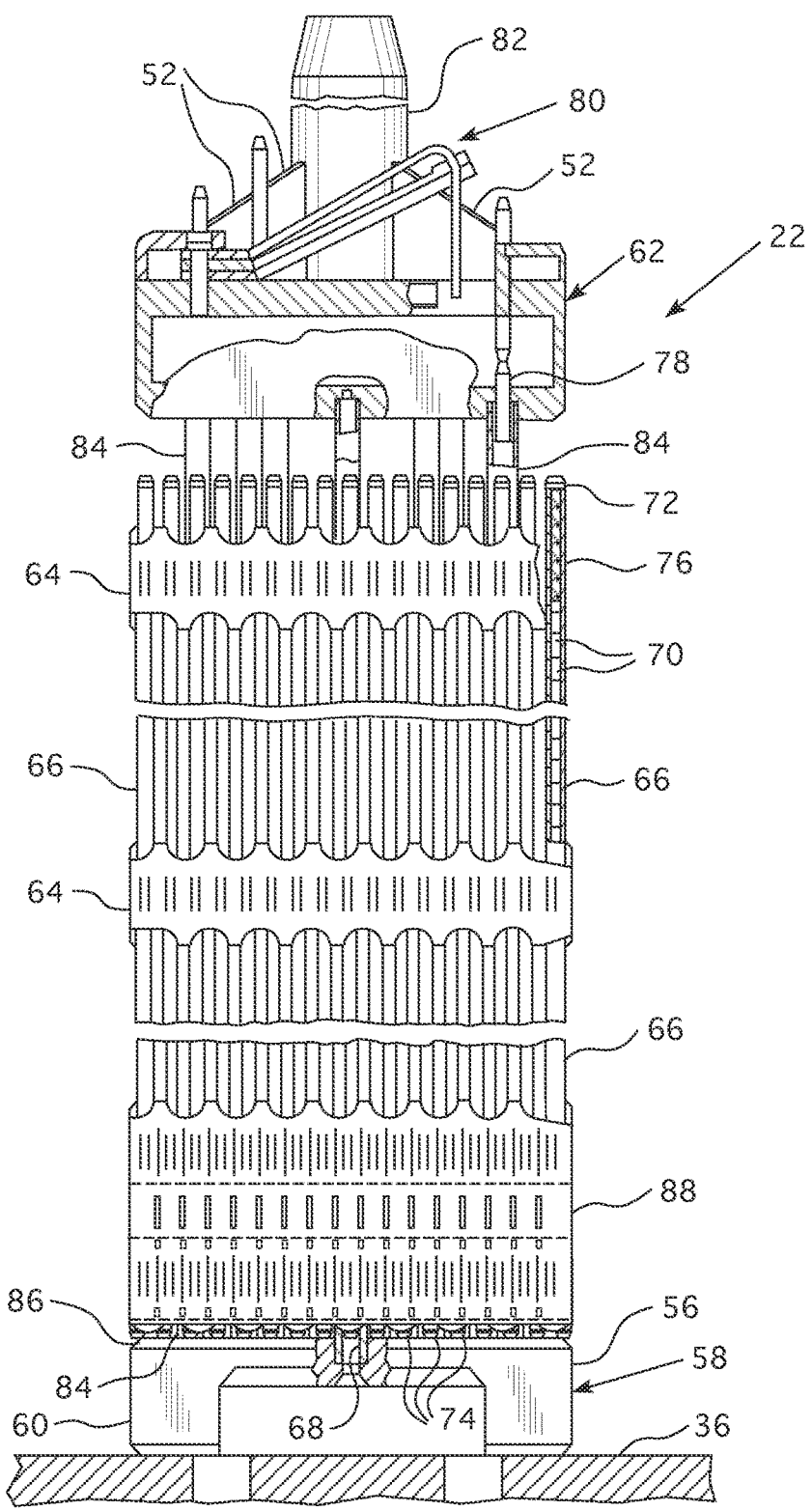
FIG. 3 is an elevational view, partially in section, of a fuel assembly illustrated in vertically shortened form, with parts broken away for clarity.

The present invention relates to a bottom nozzle 58 for a fuel assembly which, in addition to supporting the fuel assembly 22 on the lower core plate 36, also contains features which function to reduce the pressure drop across the nozzle. This can be appreciated from FIG. 3. The bottom nozzle includes a support means, for example, the skirt 56 shown in FIG. 3. The support means, skirt 56 in this embodiment, includes a plurality of corner legs 60 for supporting the fuel assembly 22 on the lower core plate 36. A generally rectangular, planar plate 86 is suitably attached to the upper surface of the support skirt 56. In the nozzle plate 86 of this embodiment, a large number of relatively small holes are provided to accommodate the passage of coolant from below the plate 86 to and through the lower most grid 88. These holes may be small enough to trap debris to shield the fuel element cladding from damage as described in U.S. Pat. No. 7,822,165, though it should be appreciated that this invention can provide a benefit to most any type of flow through hole in a fuel assembly seeking to minimize pressure drop.

This invention recognizes that a significant portion of the pressure drop associated with the bottom nozzle flow plate 86 is due to abrupt changes in flow area. This advanced bottom nozzle concept incorporates "egg-crate" type features on either or both the upstream and downstream sides of the bottom nozzle flow plate 86 to gradually change the lateral flow area in the flow through path through the flow plate 86.

Figure 4:
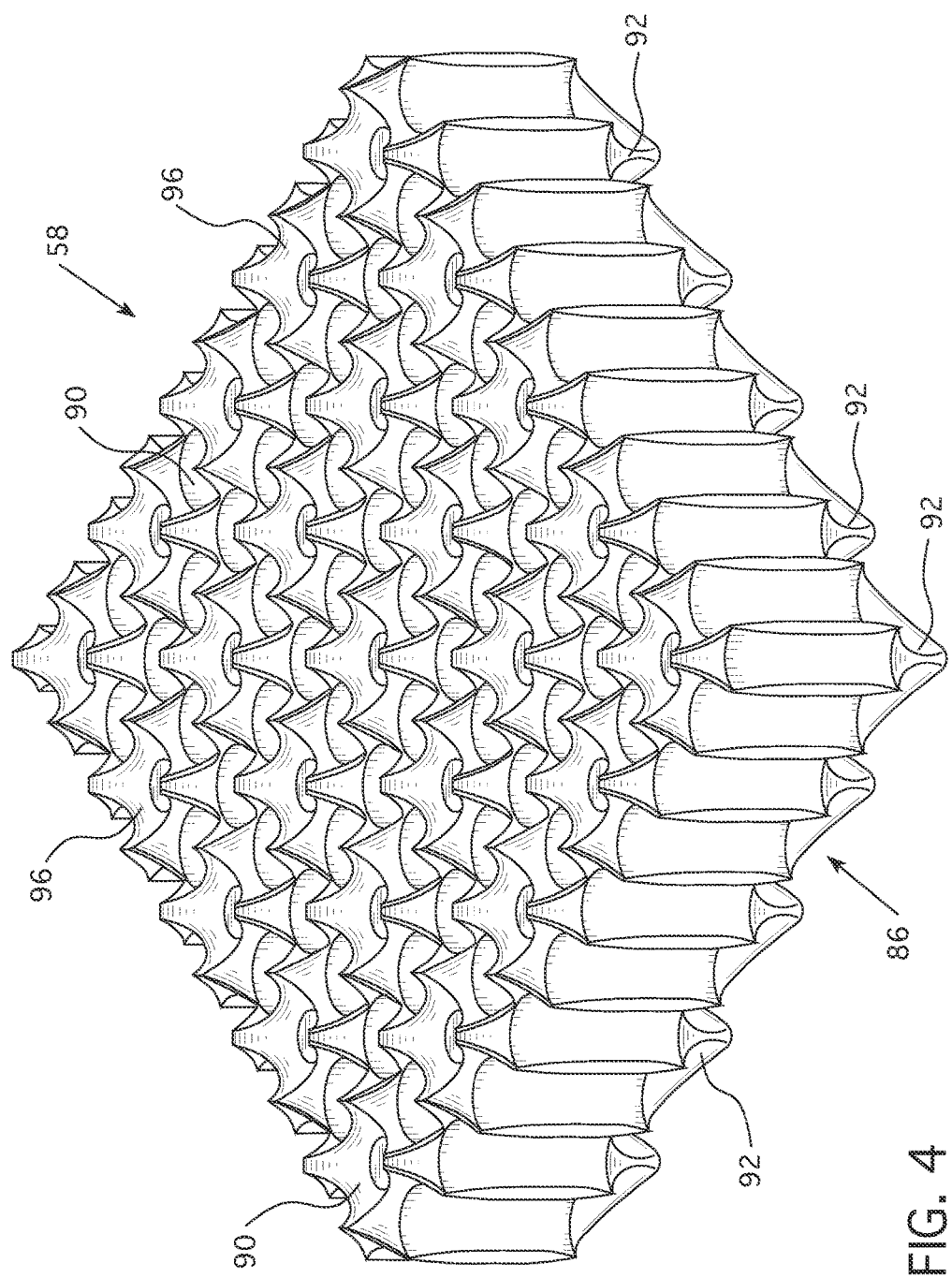
FIG. 4 is an isometric view of a portion of one embodiment of the bottom nozzle top plate and flow through holes of this invention showing recesses in the upper face that interface with the fuel rod end plugs.
Figure 5:
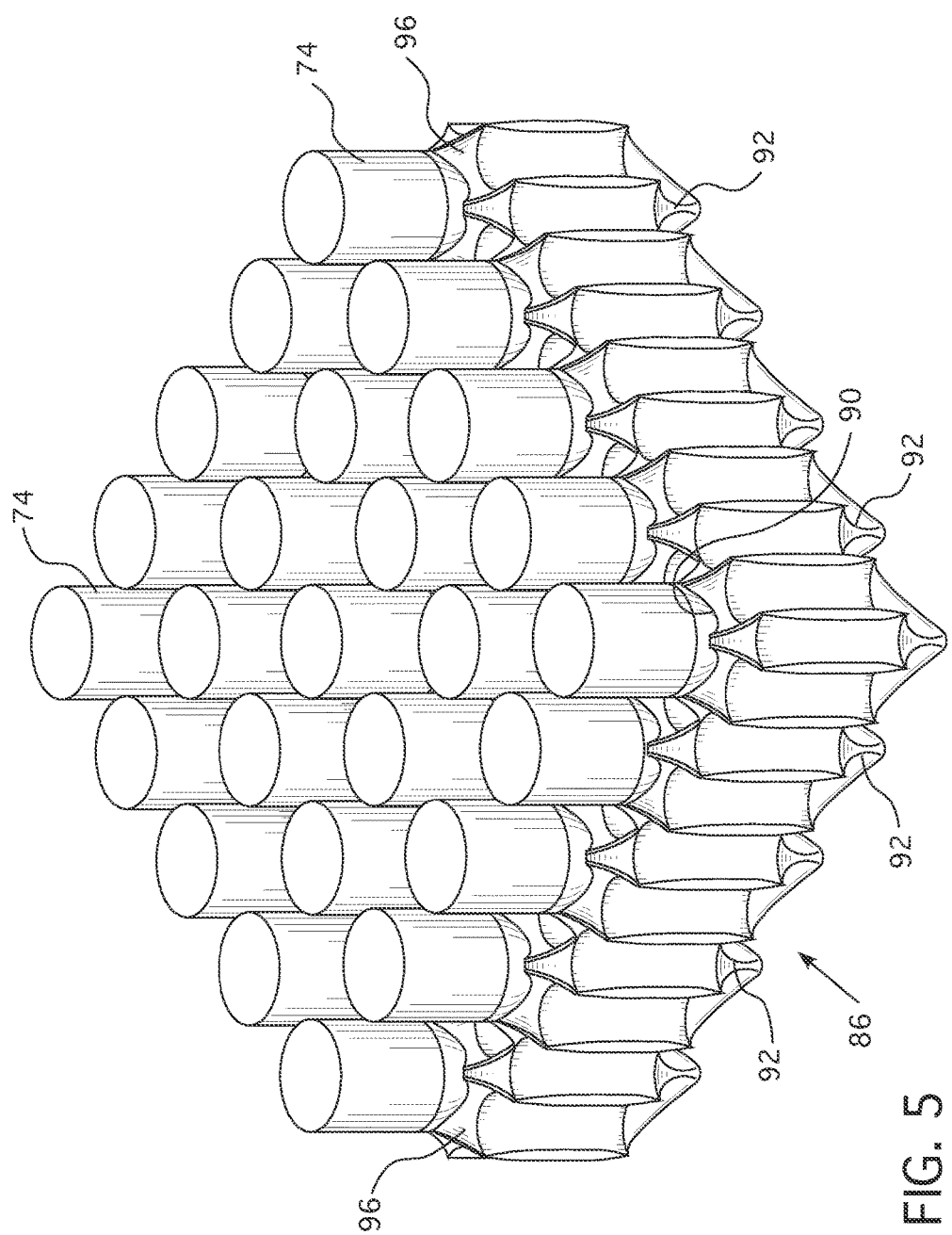
FIG. 5 is an isometric view of the embodiment shown in FIG. 4 with the fuel rod end plugs in position.
Figure 6:
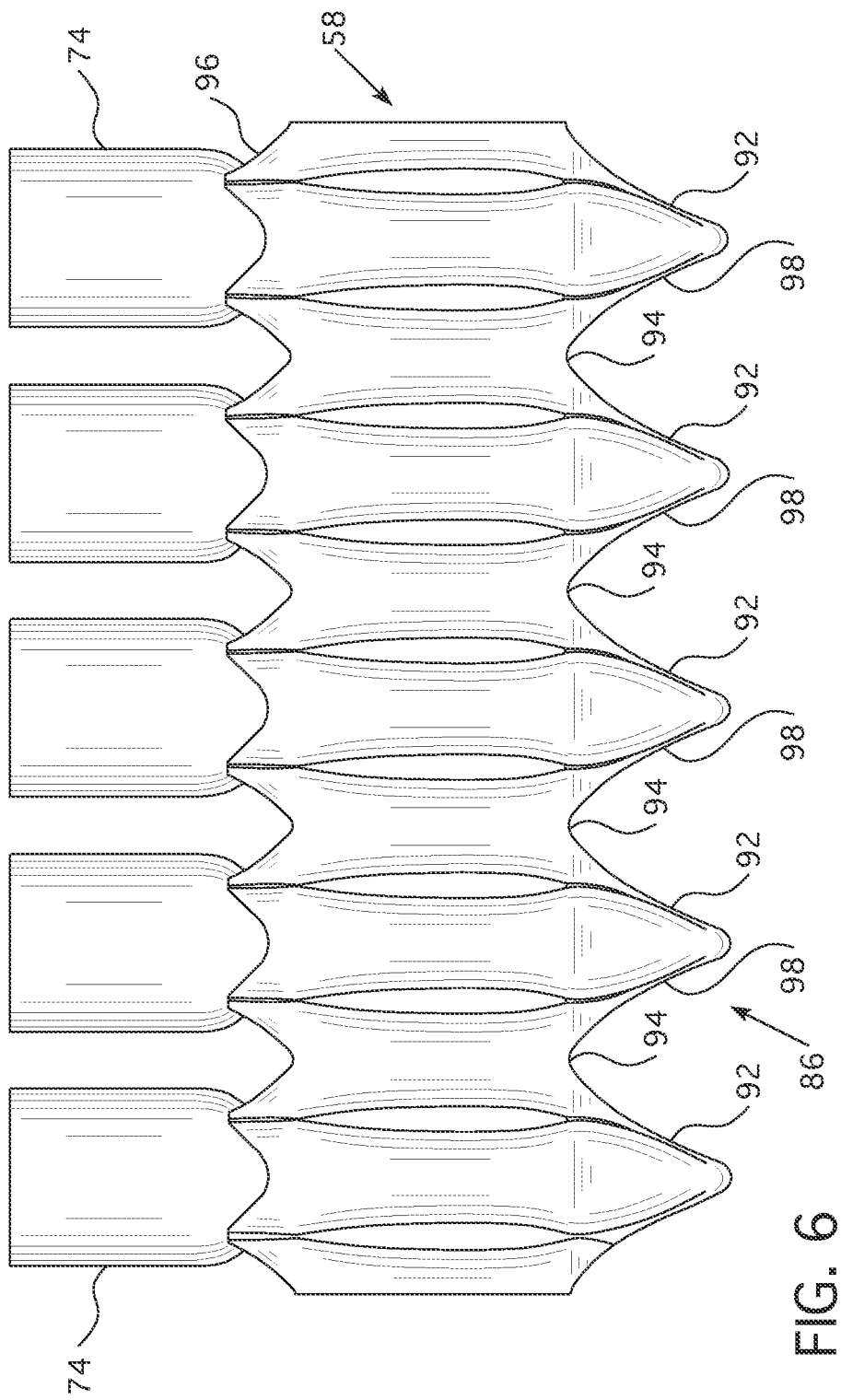
FIG. 6 is a partial side view of the embodiment illustrated in FIGS. 4 and 5.
Figure 7:
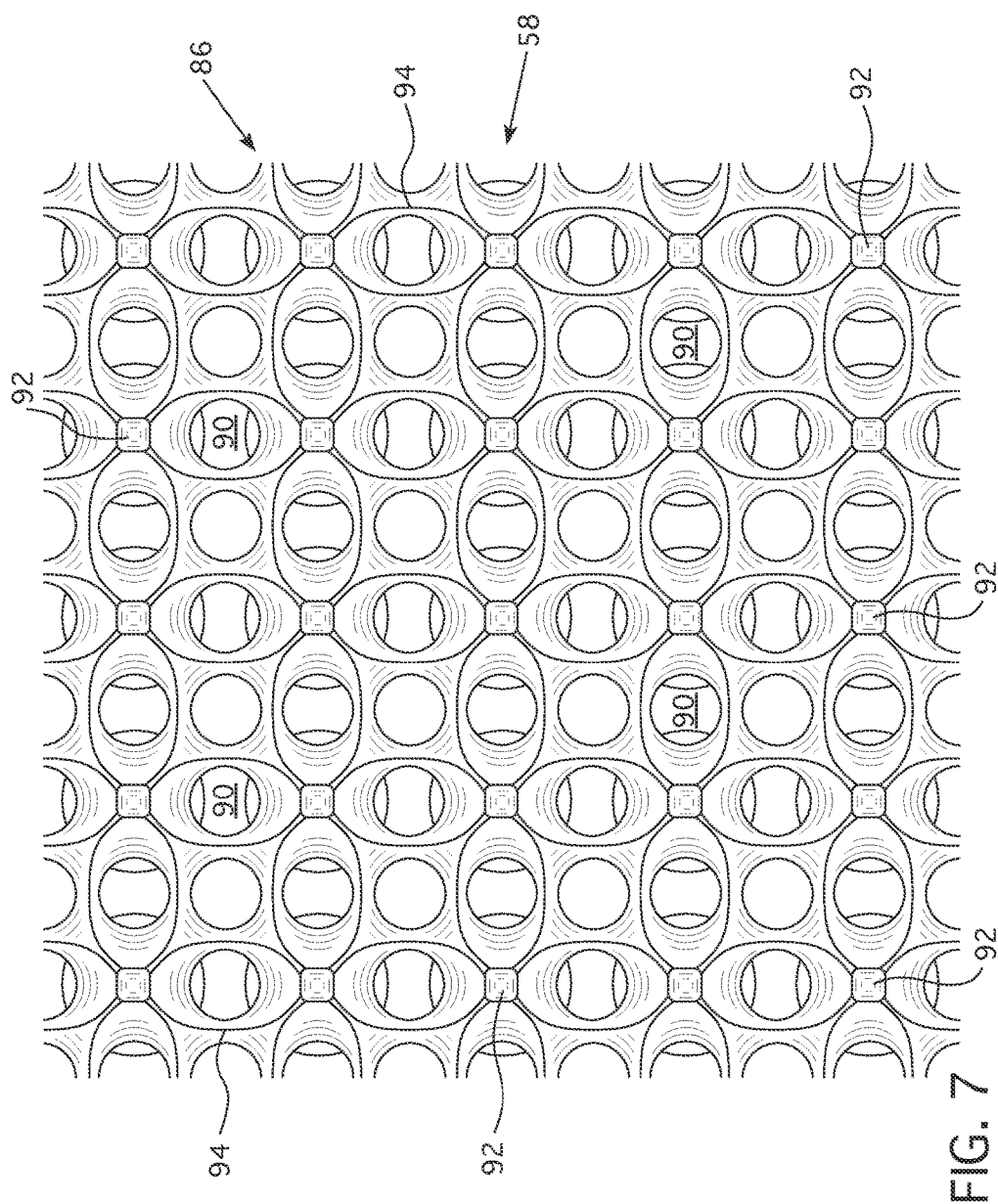
FIG. 7 is a bottom plan view of the embodiment illustrated in FIGS. 4 and 5.
Figure 8:
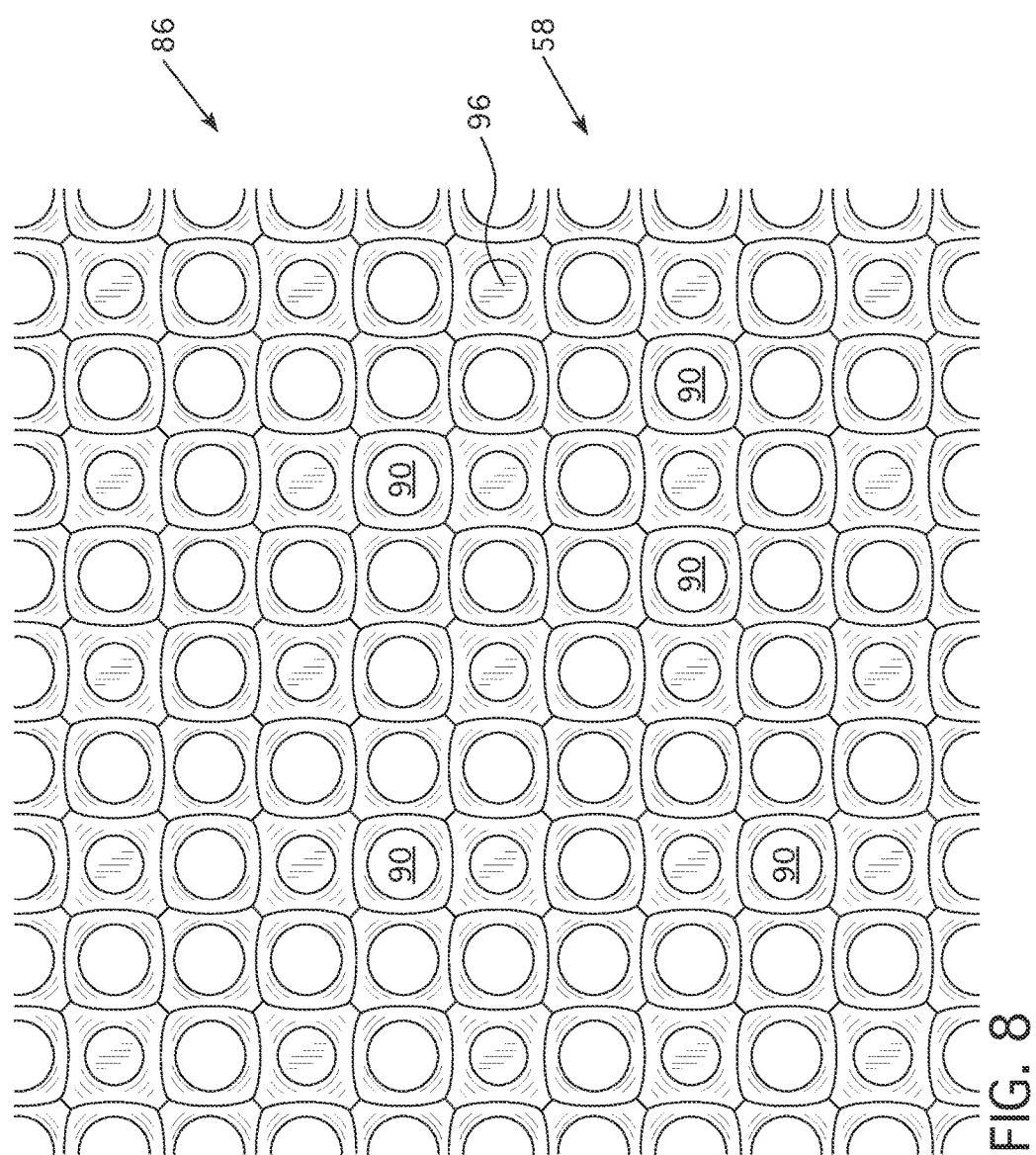
FIG. 8 is a top plan view of the embodiment illustrated in FIGS. 4 and 5 (with portions of the end plugs removed)
Figure 9:
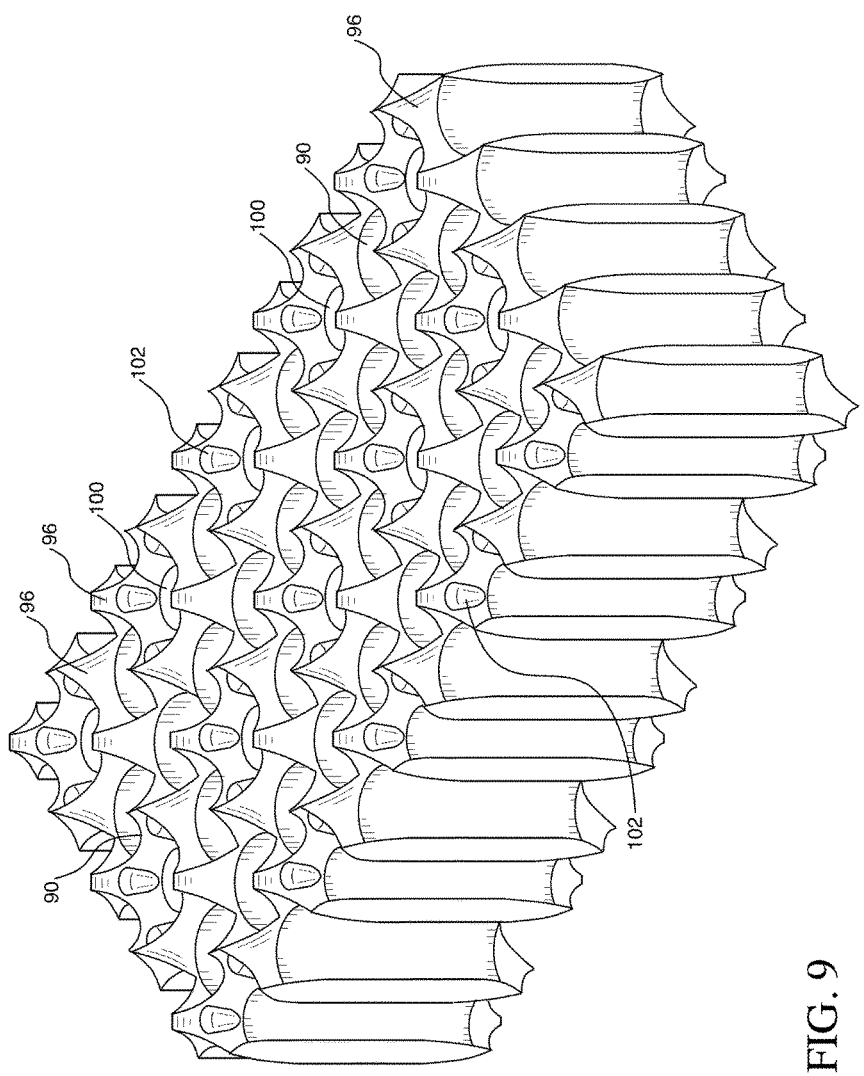
FIG. 9 is a sectioned isometric view of another embodiment of the bottom nozzle top plate and flow through holes of this invention.
Figure 10:
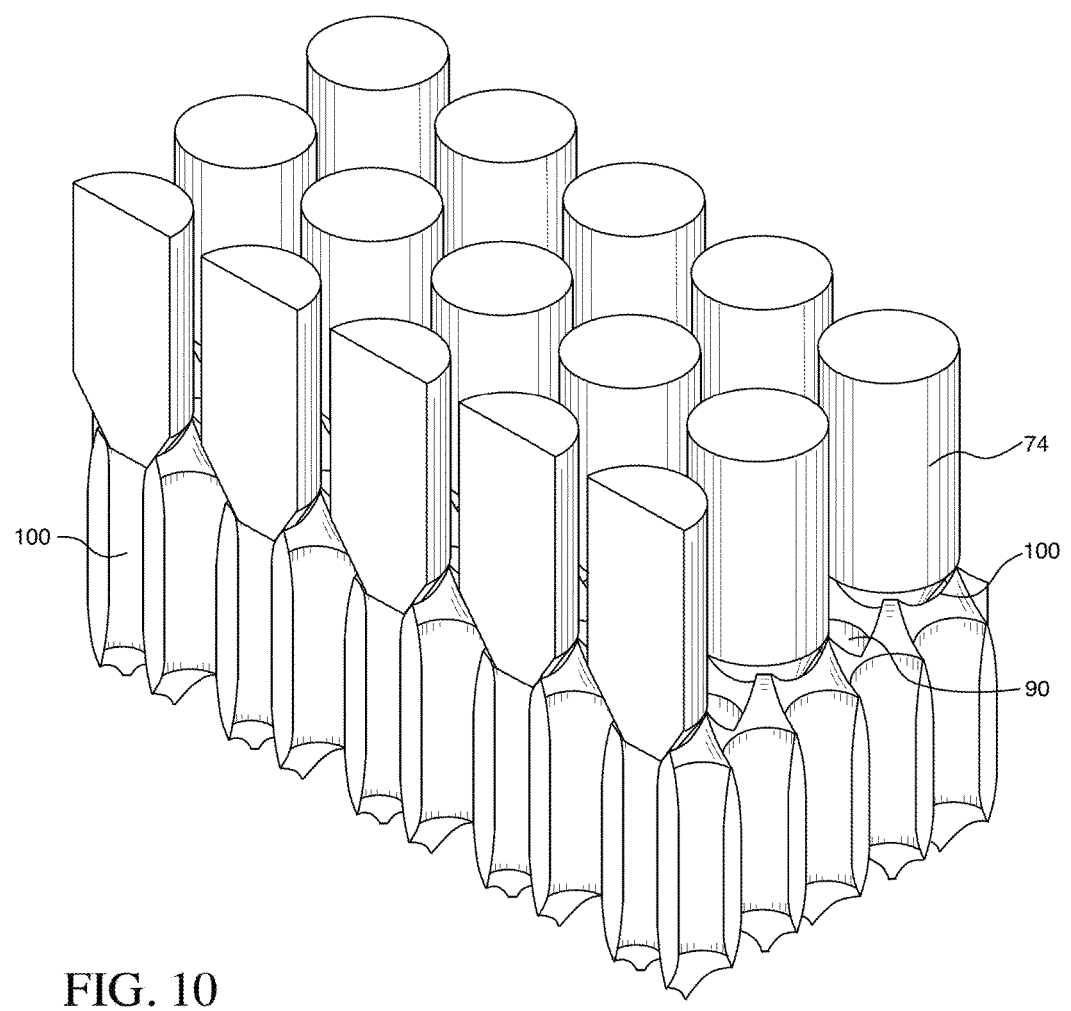
FIG. 10 is the sectioned isometric view shown in FIG. 9 with the lower portion of a number of fuel element end plugs shown interfacing with the appendages of this invention.
Figure 11:
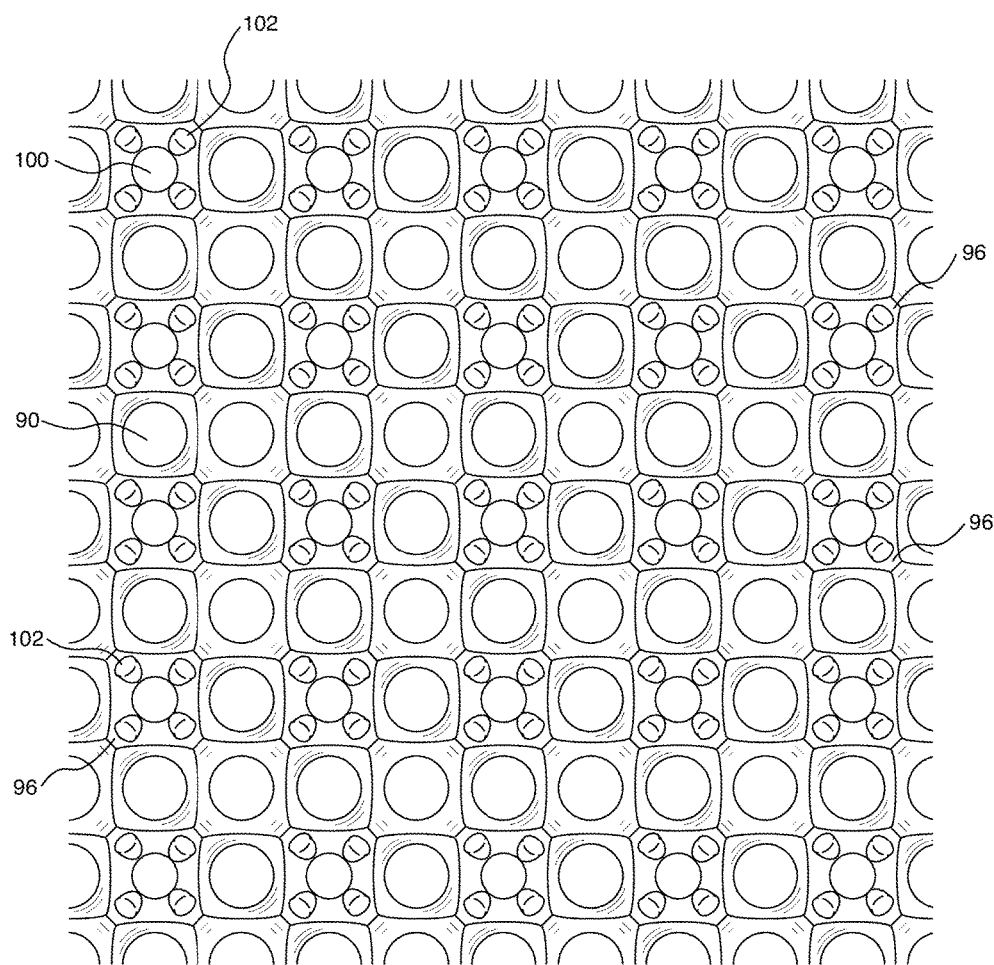
FIG. 11 is a top view of the horizontal lower nozzle plate of FIGS. 9 and 10, showing the positioning of the flow through holes.
Figure 12:
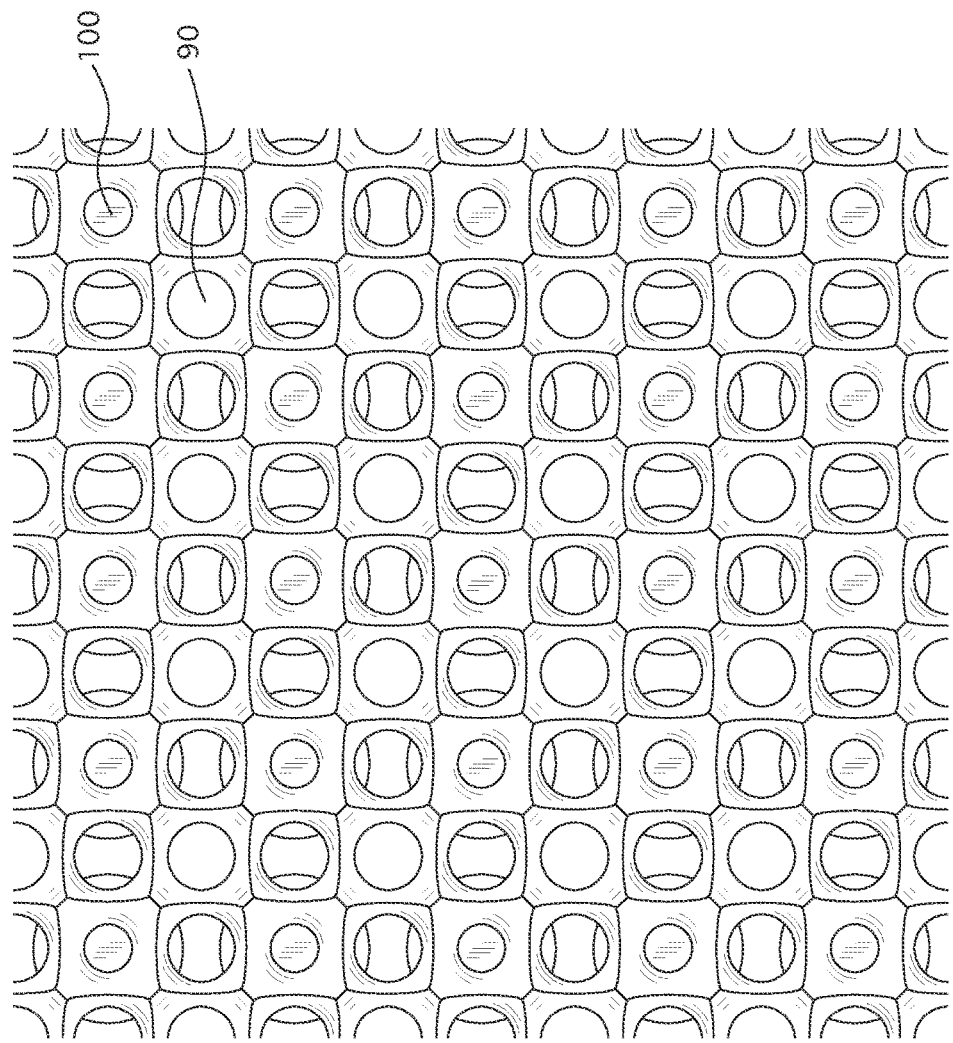
FIG. 12 is a bottom view of the hole pattern shown in FIG. 11.
Figure 13:
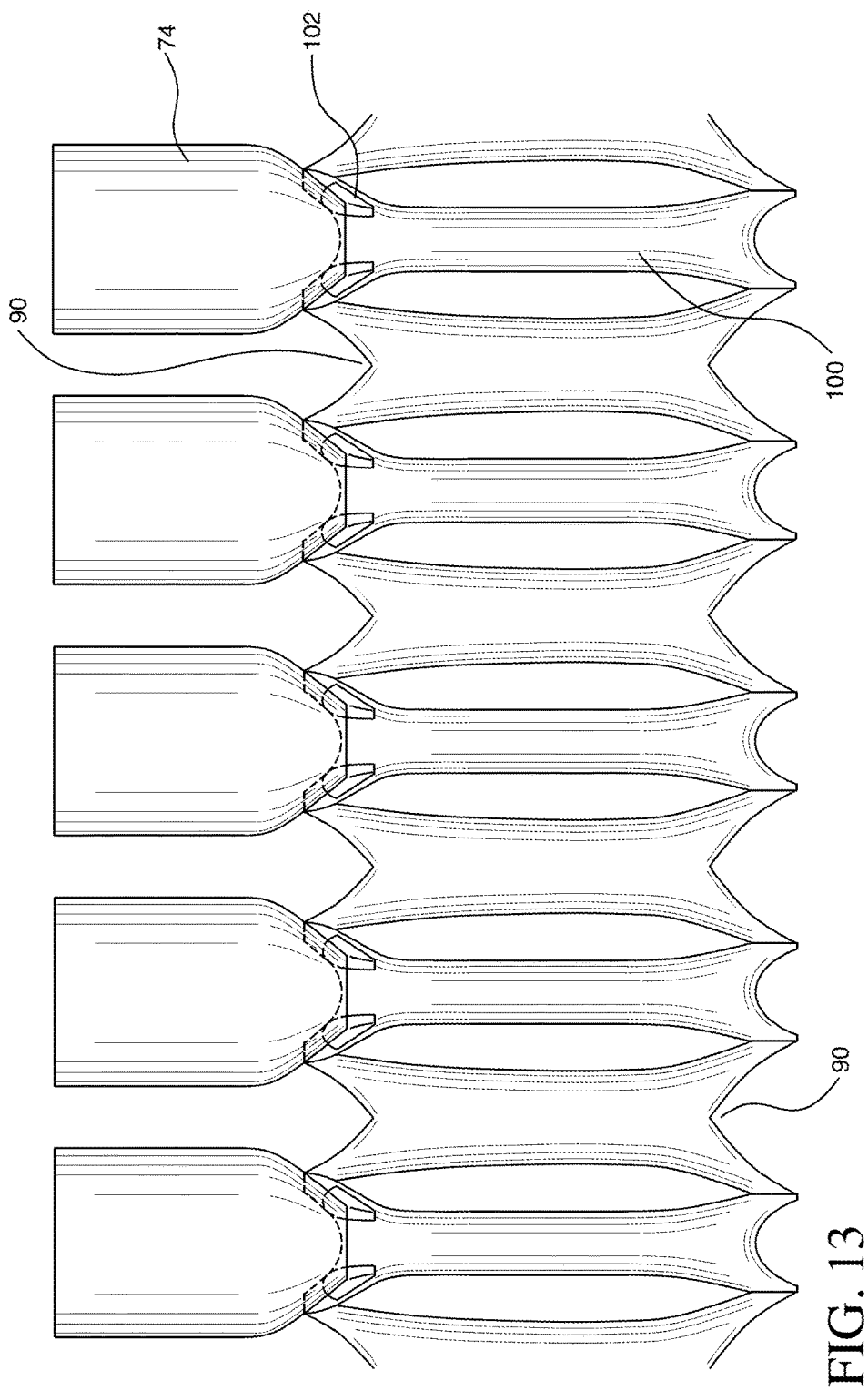
FIG. 13 is a sectioned side view of the flow holes (shown with the lower end of the fuel rod end plugs).

FIGS. 4 through 8 show a portion of one embodiment of a flow plate 86 incorporating the features claimed hereafter. FIG. 4 shows an isometric view of a portion of the flow plate 86 with parts of the flow through holes 90 broken away to observe the interior of the flow through holes. FIG. 5 is the isometric view illustrated in FIG. 4 with the fuel rod end plugs 74 shown in position above the flow plate 86. FIG. 6 is a side view of a portion of the flow plate shown in FIG. 5. FIG. 7 is a bottom plan view of the flow plate shown in FIG. 5; and FIG. 8 is a top plan view of the portion of the flow plate shown in FIG. 4. On the upstream side (i.e., from the underside of the flow plate 86), which can best be appreciated from FIG. 7, streamlined "egg-crate" protrusions 92 gradually reduce the lateral flow area to minimize form losses associated with the rapid contraction that the coolant flow must undergo as it enters the perforated flow plate at the entrance to the flow holes 90. These "egg-crate" protrusions 92 also eliminate high pressure pockets of recirculating flow below each fuel rod location. The protrusions 92 are funnel-like extensions of the openings of the flow through holes 90 with a lip 98 that surrounds an opening on the lower most extent of the protrusions 92 having depressions 94 that in one embodiment are approximately equally spaced around its circumference; though it should be appreciated that the depressions need not be equally spaced to obtain some reduction in pressure drop. The depressions in the lip 94 form a scalloped contour. Additionally, though the protrusions 92 extending on either side of the flow plate 86 are shown to be approximately the same height, the height may vary over the surface of the plate and still obtain a reduction in pressure drop.

On the downstream side (i.e., between the flow plate 86 and the fuel rods), streamlined "egg-crate" protrusions 96 gradually increase the lateral flow area to minimize form losses associated with the rapid expansion and contraction that the coolant experiences in the transition from the flow plate 86 to the fuel rod bundle. Due to the close proximity of the fuel rod bottom end plugs 74, the downstream "egg-crate" protrusions are recessed in the upper face of the plate 86 to interface with the fuel rods 66. There are no changes to the axial elevations of the fuel rods.

The development of advanced fabrication techniques such as additive manufacturing makes the manufacture of this design more convenient, though it should be appreciated that traditional manufacturing techniques can also be employed. Though the egg-crate protrusion design has been applied to the upper and lower surfaces of the flow through plate 86 it should be appreciated that either of these designs may be employed alone to obtain some reduction in pressure drop or together to minimize the pressure drop for maximum benefit.

Furthermore, an additional reduction in pressure drop can be achieved employing the embodiment illustrated in FIGS. 9-13. This embodiment retains the streamlined flow passages unique to the foregoing embodiment, which has the flow through holes substantially aligned with the unoccupied spaces between the lowermost grid and the fuel rod, but adds an additional flow path substantially in-line with the fuel rods. The additional flow holes 100 are of a similar design to the other flow holes 90, but are positioned directly under the fuel rods, are preferably smaller in diameter and have a set of standoffs 102 supporting the fuel rods and allowing the coolant flow to exit the bottom nozzle. The standoff may be the peaks of the scalloped lips of the appendages and ensure that the fuel rods don't block the flow holes during operation. Because the additional flow holes 100 are directly under the fuel rods they provide a "no-line-of-sight" path for the flow which helps minimize debris from passing thru the bottom nozzle yet help reduce the overall loss coefficient of the bottom nozzle by providing an additional flow path. Testing of this added feature showed a significant improvement over the embodiment employing the appendages without the additional flow holes in-line with the fuel rods.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly including:
   a plurality of elongated nuclear fuel rods having an extended axial length;
   at least a lowermost grid supporting said fuel rods in an organized array and having unoccupied spaces defined therein adapted to allow flow of fluid coolant therethrough and past said fuel rods when said fuel assembly is installed in a nuclear reactor;

a plurality of guide thimbles extending along said fuel rods through and supporting said grid;

a bottom nozzle disposed below said grid, below lower ends of said fuel rods, supporting said guide thimbles and having openings therethrough to allow the flow of fluid coolant into said fuel assembly, the bottom nozzle comprising:

a substantially horizontal plate, orthogonal to the axis of the fuel rods, having an upper face directed substantially toward the lowermost grid and a lower face on an underside of said horizontal plate with said openings extending therethrough for the flow of coolant, at least some of said openings in at least one of either the upper face or the lower face having a funnel-like first appendage respectively extending above the upper face or below the lower face, as the case may be, around at least some of the openings in the one of the upper face or the lower face with an opening at the first appendage's substantially highest extent, in the case of the upper face or lowest extent, in the case of the lower face, having a larger diameter than a diameter of the opening in the one of the upper face or the lower face, an internal wall of the first appendage substantially gradually decreasing in diameter from the opening at the first appendage's substantially highest extent in the case of the upper face or substantially lowest extent in the case of the lower face, until the wall of the first appendage transitions to the opening in the upper face or lower face, as the case may be and wherein a lip of at least some of the openings at the first appendage's substantially highest extent in the case of the upper face or lowest extent in the case of the lower face, has a scalloped contour.

2. The nuclear fuel assembly of claim 1 wherein the scalloped lip has four substantially equally spaced depressions, resembling the contour of an egg receptacle in an egg carton.

3. The nuclear fuel assembly of claim 1 wherein the substantially horizontal plate has a plurality of such openings extending therethrough and substantially all of the lips of the openings at the first appendages' substantially highest extents in the case of the upper face or lowest extents in the case of the lower face, have a scalloped contour.

4. The nuclear fuel assembly of claim 1 including a funnel-like second appendage extending outwardly from at least some of the openings in another of the upper face or the lower face with an opening at the second appendages' substantially highest extent in the case of the upper face or lowest extent in the case of the lower face, having a larger diameter than a diameter of the opening in the another of the upper face or the lower face, an internal wall of the second appendage substantially gradually decreases in diameter from the opening at the second appendages' substantially highest extent in the case of the upper face or lowest extent in the case of the lower face until the wall of the second appendage transitions to the opening in the another of the upper face or the lower face.

5. The nuclear fuel assembly of claim 4 wherein a lip of at least some of the openings at the second appendages' substantially highest extent in the case of the upper face or lowest extent in the case of the lower face, has a scalloped contour.

6. The nuclear fuel assembly of claim 5 wherein the scalloped lip has four substantially equally spaced depressions resembling the contour of an egg receptacle in an egg carton.

7. The nuclear fuel assembly of claim 6 wherein the appendage to the upper face is at least partially recessed within a corresponding one of the openings in the upper face.

8. The nuclear fuel assembly of claim 4 wherein substantially all of the lips of the appendages' substantially highest extent, on the upper face have a scalloped contour.

9. The nuclear fuel assembly of claim 4 wherein the appendages to the upper face terminate below the lower ends of the fuel rods.

10. The nuclear fuel assembly of claim 9 wherein the highest extent of the appendages to the upper face is smaller than the lowest extent of the appendages to the lower face.

11. The nuclear fuel assembly of claim 1 wherein at least some of the openings in the bottom nozzle substantially align with the unoccupied spaces in the lowermost grid.

12. A nuclear fuel assembly including:

a plurality of elongated nuclear fuel rods having an extended axial length;

at least a lowermost grid supporting said fuel rods in an organized array and having unoccupied spaces defined therein adapted to allow flow of fluid coolant therethrough and past said fuel rods when said fuel assembly is installed in a nuclear reactor;

a plurality of guide thimbles extending along said fuel rods through and supporting said grid;

a bottom nozzle disposed below said grid, below lower ends of said fuel rods, supporting said guide thimbles and having openings therethrough to allow the flow of fluid coolant into said fuel assembly, the bottom nozzle comprising:

a substantially horizontal plate, orthogonal to the axis of the fuel rods, having an upper face directed substantially toward the lower most grid and a lower face on an underside of said horizontal plate with said openings extending therethrough for the flow of coolant, at least some of said openings in at least one of either the upper face or the lower face having a funnel-like first appendage respectively extending above the upper face or below the lower face, as the case may be, around at least some of the openings in the at least one of the upper face or the lower face with an opening at the first appendage's substantially highest extent, in the case of the upper face or lowest extent, in the case of the lower face, having a larger diameter than a diameter of the opening in the at least one of the upper face the lower face, an internal wall of the first appendage substantially gradually decreasing the lateral flow area axially through the first appendage as the first appendage transitions from the opening at the first appendage's substantially highest extent, in the case of the upper face or lowest extent, in the case of the lower face, to the opening in upper face or the lower face, as the case may be, wherein a lip of at least some of the openings at the first appendage's substantially highest extent in the case of the upper face or lowest extent in the case of the lower face, has a scalloped contour.

13. The nuclear fuel assembly of claim 12 including a funnel-like second appendage extending up from at least some of the openings in another of the upper face or the lower face with an opening at the second appendage's substantially highest extent, in the case of the upper face, or lowest extent, in the case of the lower face, having a larger diameter than a diameter of the opening in the another of the upper face or the lower face, an internal wall of the second appendage substantially gradually decreases the lateral flow area axially through the second appendage as the second appendage transitions from the opening at the second appendage's substantially highest extent in the case of the upper face or lowest extent in the case of the lower face to the opening in the another of the upper face or the lower face, as the case may be.

14. The nuclear fuel assembly of claim 13 wherein the appendage to the upper face is at least partially recessed within a corresponding one of the openings in the upper face.

15. The nuclear fuel assembly of claim 1 wherein the openings for the flow of coolant include both first openings that are aligned with the unoccupied spaces in the lowermost grid and additional openings that are aligned with the fuel rods.

16. The nuclear fuel assembly of claim 15 wherein at least some of the additional openings have appendages substantially the same in general design as the first appendage.

17. The nuclear fuel assembly of claim 16 wherein the additional openings respectively have a standoff at a coolant flow exit, with the standoff configured to prevent the fuel rod from closing off the coolant flow exit.

18. The nuclear fuel assembly of claim 17 wherein the highest extend of the appendages to additional openings on the upper face have a scalloped lip forming peaks and valleys wherein the peaks form the standoff.

19. The nuclear fuel assembly of claim 15 wherein the additional openings are smaller in diameter than the openings aligned with the unoccupied spaces.

20. A nuclear fuel assembly including:
a plurality of elongated nuclear fuel rods having an extended axial length;
at least a lowermost grid supporting said fuel rods in an organized array and having unoccupied spaces defined therein adapted to allow flow of fluid coolant therethrough and past said fuel rods when said fuel assembly is installed in a nuclear reactor;
a plurality of guide thimbles extending along said fuel rods through and supporting said grid;
a bottom nozzle disposed below said grid, below lower ends of said fuel rods, supporting said guide thimbles and having openings therethrough to allow the flow of fluid coolant into said fuel assembly, the bottom nozzle comprising:
a substantially horizontal plate, orthogonal to the axis of the fuel rods, having an upper face directed substantially toward the lowermost grid and a lower face on an underside of said horizontal plate with said openings extending therethrough for the flow of coolant, at least some of said openings positioned in line with a corresponding one of the fuel rods and wherein a lip of at least some of the openings' substantially highest extent in the case of an upper face of the substantially horizontal plate or lowest extent in the case of the lower face of the horizontal plate, has a scalloped contour.

21. The nuclear fuel assembly of claim 20 wherein at least some of the openings are in line with the unoccupied spaces.

22. The nuclear fuel assembly of claim 21 wherein the openings in line with the unoccupied spaces are larger than the openings in line with the fuel rods.

* * * * *